(No Model.)
C. C. HIGHAM.
ADJUSTABLE LOCK FOR BOLTS AND SHAFTS.
No. 347,798. Patented Aug. 24, 1886.
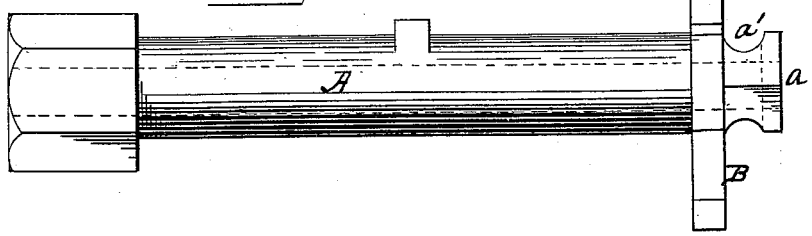
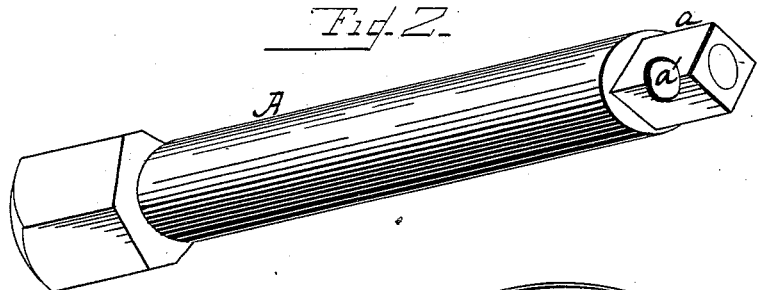
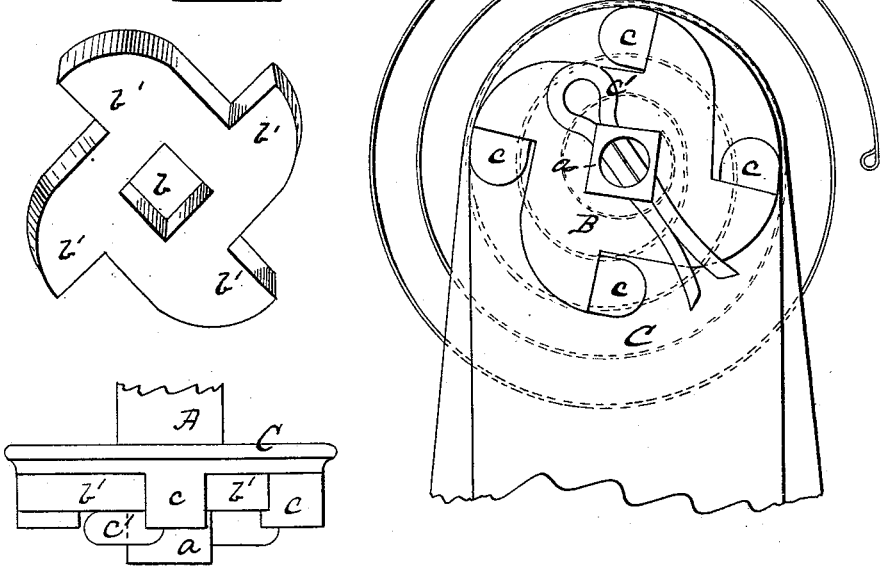
Witnesses
G. A. Taubesschmidt
T. P. Metzger
Inventor
Charles C. Higham
by F. W. Ritter Jr. Atty

UNITED STATES PATENT OFFICE.

CHARLES C. HIGHAM, OF ROME, NEW YORK, ASSIGNOR TO THE AMERICAN BRAKE COMPANY, OF ST. LOUIS, MISSOURI.

ADJUSTABLE LOCK FOR BOLTS AND SHAFTS.

SPECIFICATION forming part of Letters Patent No. 347,798, dated August 24, 1886.

Application filed January 22, 1886. Serial No. 189,425. (No model.)

*To all whom it may concern:*

Be it known that I, CHARLES C. HIGHAM, a citizen of the United States, residing at Rome, in the county of Oneida, State of New York, have invented certain new and useful Improvements in Adjustable Locks for Rotatable Bolts, Shafting, &c.; and I hereby declare the following to be a full, clear, and exact description of the same, reference being had to the accompanying drawings, in which—

Figure 1 is an elevation of a shaft or bolt and lock-washer embodying my invention. Fig. 2 is a detached perspective view of the bolt or shaft. Fig. 3 is a plan view of the washer. Fig. 4 is a side view of a centrifugal governor, illustrating one application of my devices in a position to which they are specially adapted, and Fig. 5 is an end view of Fig. 4.

Like letters refer to like parts wherever they occur.

My present invention relates to the construction of locking devices for rotatable bolts or shafting, and, while generally applicable wherever the movement of a bolt or shaft is to be prevented, is of special value where the bolt or shaft is to be secured or locked after partial progressive movements, as in increasing or decreasing the tension of springs, taking up slack in ropes, rotating fixed bolts or rods to change the wear or strain thereon, or, in other words, wherever an adjustable bolt or shaft lock is required, and where heretofore more or less complicated pawl-and-ratchet mechanism has been deemed necessary.

To this end the invention consists, generally stated, in a disk having a polygonal eye and a radial wing or wings adapted to fit on a polygonal shank of the shaft and lock with one or more lugs or fixed pins on the bearing.

I will now proceed to describe my invention more specifically, so that others skilled in the art to which it appertains may apply the same.

In the drawings, A indicates the shaft or bolt, which is adapted to rotate in bearings, if not confined, said bolt having a shank, $a$, of polygonal or equivalent form, which will prevent the rotation of a washer or disk having a corresponding eye, said shank provided with a hole, $a'$, for the reception of a key or cotter.

The hole $a'$ should be about as far from the shoulder of the shank as the disk B is thick, so that the disk will also perform the function of a washer between the journal-bearing and the key or cotter.

B indicates a disk having an eye, $b$, of a form to correspond with the polygonal shank $a$ of bolt or shaft A, and provided with one or more radial wings, $b'$, of a form adapted to engage with the fixed stops and lock the shaft against movement in at least one direction, and preferably against rotation in either direction.

The disk B is readily detachable from the shank or shaft A.

C indicates the bearing of the rotatable bolt or shaft A, on which are a series of fixed stops, pins, or lugs, $c$, arranged around the journal or end of the shaft at intervals and adjacent thereto, so as to engage with the radial wings $b'$ of the disk B.

The above constitute the novel devices.

In using the devices the shaft or bolt is first placed in its bearings and rotated to the desired position. The disk B is then slipped on the shank $a$, and its radial wings $b'$ engage the lugs or fixed pins $c$, and the key or cotter $c'$ is then inserted in the hole of the shank, and confines the lock-washer, as before specified. Whenever the bolt or shaft is to be rotated, the cotter $c'$ must be withdrawn and the washer-lock slipped along the shank $a$ until disengaged from the fixed lugs $c$ of the bearing. When the bolt or shaft has been rotated the desired distance, the washer is again forced back and the cotter $c'$ replaced.

Any form of fixed lug $c$ and radial wings $b'$ may be employed; but the form shown is by me deemed most desirable, as the strain on the wings is in lines which lead away from the eye of the disk-washer, and the angles of the fixed lugs enter the angle between the base of the wing and disk and form two bearings at right angles to each other, and thus prevent the bolt rotating in either direction.

In one application thereof (shown in Figs. 4 and 5) the rotatable bolt or shaft A is used as the fulcrum or pivot of the centrifugal governor-arms, and as a means for securing one end of a coiled spring, which spring is coiled or uncoiled to increase or decrease its tension, and therefore requires a rotatable shaft which can be readily locked after partial rotation. This centrifugal governor can be found fully described in the patent of G. H. Poor, No. 317,572, May 12, 1885.

It is evident that any mechanic will at once recognize many other places where the construction herein described has special value.

Having thus described my invention and pointed out its advantages and one of its many practical uses and forms, what I claim, and desire to secure by Letters Patent, is—

1. The combination, with a bolt or shaft having a polygonal shank, of a disk-washer having one or more radial wings adapted to engage with fixed stops on the bolt-bearing to prevent the rotation of the bolt or shaft, and a key or cotter for confining the disk, substantially as and for the purposes specified.

2. The combination, with a bolt or shaft having a polygonal shank, of a locking-washer having a polygonal eye which corresponds with the shank of the bolt, and provided with radial wings $b'$, and a bearing having projections or stops with rectangular faces to engage in the angles between the radial wings, substantially as and for the purposes specified.

In testimony whereof I affix my signature, in presence of two witnesses, this 2d day of January, 1886.

CHARLES C. HIGHAM.

Witnesses:
  E. B. LEIGH,
  GEO. H. POOR.